US011803876B1

(12) United States Patent
Greer et al.

(10) Patent No.: US 11,803,876 B1
(45) Date of Patent: *Oct. 31, 2023

(54) MULTIMEDIA COMMUNICATION SYSTEM AND METHOD

(71) Applicant: Impact Engine, Inc., La Jolla, CA (US)

(72) Inventors: Neil Greer, La Jolla, CA (US); Bennett Blank, La Jolla, CA (US); Bryan Depew, La Jolla, CA (US)

(73) Assignee: Impact Engine, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,260

(22) Filed: Feb. 21, 2023

Related U.S. Application Data

(63) Continuation of application No. 16/792,087, filed on Feb. 14, 2020, now Pat. No. 11,587,117, which is a
(Continued)

(51) Int. Cl.
*G06Q 30/0251* (2023.01)
*G06F 16/50* (2019.01)
(Continued)

(52) U.S. Cl.
CPC ....... *G06Q 30/0256* (2013.01); *G06F 3/0482* (2013.01); *G06F 16/4393* (2019.01);
(Continued)

(58) Field of Classification Search
None
See application file for complete search history.

(56) References Cited

U.S. PATENT DOCUMENTS 6,266,683 B1 7/2001 Yehuda et al.
6,601,057 B1 7/2003 Underwood et al.
(Continued)

FOREIGN PATENT DOCUMENTS

EP 1376406 A2 1/2004
EP 1431977 A2 6/2004
(Continued)

OTHER PUBLICATIONS

"EdgeSuite 5.0: ESI Developer's Guide", by Akamai. Aug. 29, 2004. pp. 7-11, 99, 104-105. (Year: 2004).*
(Continued)

*Primary Examiner* — Ilana L Spar
*Assistant Examiner* — Allan J Woodworth, II
(74) *Attorney, Agent, or Firm* — FisherBroyles LLP; James P. Cleary

(57) ABSTRACT

Systems and methods are disclosed for creating, editing, sharing and distributing high-quality, media-rich web-based communications. The communications are created in a layered fashion that integrates user-selected text, colors, background patterns, images, sound, music, video, or other media. The systems and methods are used to generate, edit, broadcast, and track electronic presentations, brochures, advertisements (such as banner advertisements on highly trafficked media websites), announcements, and interactive web pages, without the need for the user to understand complex programming languages.

22 Claims, 16 Drawing Sheets

Related U.S. Application Data continuation of application No. 15/937,568, filed on Mar. 27, 2018, now Pat. No. 10,565,618, which is a continuation of application No. 15/795,136, filed on Oct. 26, 2017, now Pat. No. 10,068,253, which is a continuation of application No. 15/174,945, filed on Jun. 6, 2016, now Pat. No. 9,805,393, which is a continuation of application No. 14/590,881, filed on Jan. 6, 2015, now Pat. No. 9,361,632, which is a continuation of application No. 13/741,332, filed on Jan. 14, 2013, now Pat. No. 8,930,832, which is a continuation of application No. 13/004,862, filed on Jan. 11, 2011, now Pat. No. 8,356,253, which is a continuation of application No. 11/404,509, filed on Apr. 13, 2006, now Pat. No. 7,870,497.

(60) Provisional application No. 60/671,170, filed on Apr. 13, 2005.

(51) Int. Cl.
*G06F 16/438* (2019.01)
*G06F 40/103* (2020.01)
*G06F 40/186* (2020.01)
*G06F 40/197* (2020.01)
*G06F 40/106* (2020.01)
*H04L 65/611* (2022.01)
*H04L 41/22* (2022.01)
*G06Q 30/0241* (2023.01)
*G06F 3/0482* (2013.01)

(52) U.S. Cl.
CPC .......... *G06F 16/50* (2019.01); *G06F 40/103* (2020.01); *G06F 40/106* (2020.01); *G06F 40/186* (2020.01); *G06F 40/197* (2020.01); *G06Q 30/0276* (2013.01); *G06Q 30/0277* (2013.01); *H04L 41/22* (2013.01); *H04L 65/611* (2022.05)

(56) References Cited

U.S. PATENT DOCUMENTS

| | | | |
|---|---|---|---|
| 6,694,353 B2 | 2/2004 | Sommerer | |
| 6,910,049 B2 | 6/2005 | Fenton et al. | |
| 6,976,028 B2 | 12/2005 | Fenton et al. | |
| 7,111,254 B1 | 9/2006 | Rosen et al. | |
| 7,219,303 B2 | 5/2007 | Fish | |
| 7,315,983 B2 | 1/2008 | Evans et al. | |
| 7,398,473 B2 | 7/2008 | Stoner et al. | |
| 7,519,912 B2 | 4/2009 | Moody et al. | |
| 7,707,226 B1 | 4/2010 | Tonse | |
| 7,870,497 B2 | 1/2011 | Greer et al. | |
| 8,356,253 B2 | 1/2013 | Greer et al. | |
| 8,447,651 B1* | 5/2013 | Scholl ................ | G06Q 30/0275 705/14.54 |
| 8,930,832 B2 | 1/2015 | Greer et al. | |
| 9,361,632 B2 | 6/2016 | Greer et al. | |
| 9,805,393 B2 | 10/2017 | Greer et al. | |
| 10,068,253 B2 | 9/2018 | Greer et al. | |
| 10,565,618 B2 | 2/2020 | Greer et al. | |
| 10,572,898 B2 | 2/2020 | Greer et al. | |
| 11,488,206 B2 | 11/2022 | Greer et al. | |
| 2001/0010059 A1 | 7/2001 | Burman et al. | |
| 2002/0036654 A1 | 3/2002 | Evens et al. | |
| 2002/0194195 A1 | 12/2002 | Fenton et al. | |
| 2003/0048294 A1 | 3/2003 | Arnold | |
| 2004/0093377 A1 | 5/2004 | Lumera et al. | |
| 2004/0123238 A1 | 6/2004 | Hefetz et al. | |
| 2005/0094206 A1 | 5/2005 | Tonisson | |
| 2005/0114784 A1 | 5/2005 | Spring et al. | |
| 2005/0245241 A1 | 11/2005 | Durand et al. | |
| 2005/0251742 A1 | 11/2005 | Mogilevsky et al. | |
| 2006/0015904 A1 | 1/2006 | Marcus | |
| 2006/0074751 A1* | 4/2006 | Kline ................ | G06Q 30/0207 705/14.1 |
| 2006/0085360 A1 | 4/2006 | Grim et al. | |
| 2006/0085431 A1 | 4/2006 | Burns et al. | |
| 2006/0095320 A1 | 5/2006 | Jones | |
| 2006/0129417 A1 | 6/2006 | Williams et al. | |
| 2006/0150088 A1 | 7/2006 | Kraft et al. | |
| 2006/0253542 A1 | 11/2006 | McCausland et al. | |

FOREIGN PATENT DOCUMENTS

| | | |
|---|---|---|
| JP | 2004533076 A | 10/2004 |
| JP | 2004535006 A | 11/2004 |
| KR | 1020040040406 | 5/2004 |
| WO | 94/28480 A1 | 12/1994 |
| WO | 02/103568 A1 | 12/2002 |
| WO | 2004/097688 | 11/2004 |

OTHER PUBLICATIONS

Anonymous: "Press Release: Create Flashy Web Images with the New Macromedia", Jan. 22, 2003. pp. 1-2. Retrieved from the Internet. <URL:www.scalado.com>, [Retrieved on Oct. 13, 2003].
EPO Form 2001, Communication pursuant to Article 94(3) EPC dated Jun. 30, 2009, issued in connection with corresponding European application 06750155.1-1527. 7 pages.
First Office Action, issued in connection with corresponding Chinese application 2006800211383. 6 pages.
Notice of Allowance dated Nov. 21, 2019 from U.S. Appl. No. 16/119,915, 17 pages.
Notice of Allowance dated Jun. 1, 2022, from U.S. Appl. No. 16/799,618, 10 pages.
Notice of Allowability dated Aug. 2, 2022, from U.S. Appl. No. 16/799,618, 2 pages.
Notice of Allowance dated Nov. 10, 2022, from U.S. Appl. No. 16/792,087, 10 pages.
United States Court of Appeals for the Federal Circuit; No. 2022-2291; Appeal from the United States District Court for the Southern District of California; Reply Brief; *Impact Engine, Inc. v. Google LLC*; No. 3:19-cv-1301-CAB-DEB; dated Jun. 26, 2023; pp. 1-49.
United States Court of Appeals for the Federal Circuit; No. 2022-2291; Appeal from the United States District Court for the Southern District of California in No. 3:19-cv-1301-CAB-DEB; Response Brief of Appellee Google LLC; *Impact Engine, Inc. v. Google LLC*; dated May 5, 2023, pp. 1-78.

* cited by examiner

Easy Start Interview
First Page You See When You First Log In.
After Your First Time, You Can Always Access
This Function By Clicking The "Easy Start"
button 1) What type of Presentation would you like to create? (Drop Down List or Radio Button Selector)

- Product Showcase
- Service Brochure
- E-Business Card
- Product/Service Brochure
-Event Promotion
-Invitation
- Other 2) What is your industry? (Drop Down List or Radio Button Selector)

- Real Estate
- Insurance
- Banking
- Health Care
- Product Manufacturing
- Accounting
- Legal
- Architecture \* Answers to these questions automatically takes them to the START tab

\* Second time they log in takes them to our current service home page where the Easy Start button is always accessible

FIG. 6

Welcome to the "EDIT Mode" for this presentation.
Update the information and "look" of your multimedia presentation by Following the Steps below. When finished, click the "Finish" button to save your changes. Note: To create a presentation with up to 25 pages, select one of the templates marked "Up to 25 pages" To create a presentation with 5 pages, select one of the templates marked "5 pages".

| Start | Step 1 | Step 2 | Step 3 | Step 4 | | Advanced | | Finish |

Top of Form 1

Presentation Templates
Choose from the templates below to select the "look and feel" of your presentation. You can further customize your presentation in Steps 1-4 for a truly unique user experience.

1. Presentation Title: 2. Select Your Presentation Style:

| | | |
|---|---|---|
| Venture | Mystic | Flow |
| Currents | Tech | Process |
| Modern | Whitehaus | Atmosphere |
| Depth | Titanium | Elements |
| Horizon | Edge | Classic |

Step 1: Color Scheme and Music
| Start | Step 1 | Step 2 | Step 3 | Step 4 |     | Advanced |     | Finish |
1: Select a Color Scheme
Stock Color Schemes
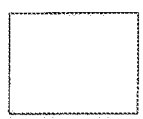  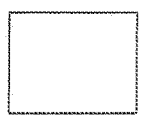  
My Color Schemes
| Select | | Add Your Own |
2: Select your Background Music Loop
Stock Music Loops
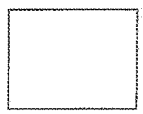 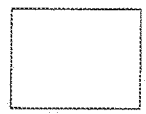   
My Music Loops
| Select | | Add Your Own |
Continue
FIG. 8

Step 3: Text and Titles

| Start | Step 1 | Step 2 | Step 3 | Step 4 |

[ Advanced ]     [ Finish ]

[ Main Headline Text ]

[ Sub Headline Text 1 ]

[ Sub Headline Text 2 ]

\* Start with the layout matching the number of pages they have selected in their pre-built template; if starting from scratch, start with only one text box like shown

| B | I | U | Make Link | Verdana | 8 | L | C | R | bits |

Up/DOWN

Page Style

Opens To:

[ Add Main Page ]  [ Add Sub Page ]  [ Delete Page ]

If Graphic Only, show as non-editable

| 1 Txt 1 Image |
| 2 Images |
| 1 large image |
| Text Only |

THIS IS WHAT
HAPPENS WHEN
THE ADVANCED
TAB IS CLICKED
Clicking on the
Advanced Tab
Spawns Steps 5
through 8
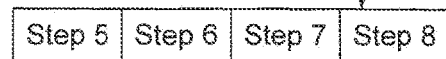
FIG. 12

Step 5: Presentation Playback Control

| Start | Step 1 | Step 2 | Step 3 | Step 4 | Step 5 | Step 6 | Step 7 | Step 8 | Finish |

| | |
|---|---|
| Show Playback Progress Timer | Checkbox |
| Show Viewer Play/Pause Buttons | Checkbox |
| Show Viewer Back/Next Buttons | Checkbox |

| | |
|---|---|
| Show Graphic Navigation Menus | Checkbox |
| Activate Auto Advance to Next Page | Checkbox |

Welcome

| | |
|---|---|
| Show The Contents Of This Page | Checkbox |
| Show Navigation Button For This Page | Checkbox |
| Auto Advance To Next Page In: Seconds | _____ |
| Launch Web-Link URL / email  Click "Edit" To Add Link. | EDIT |

Welcome

| | |
|---|---|
| Show The Contents Of This Page | Checkbox |
| Show Navigation Button For This Page | Checkbox |
| Auto Advance To Next Page In: Seconds | _____ |
| Launch Web-Link URL / email  Click "Edit" To Add Link. | EDIT |

FIG. 13

Step 6: Editorial Control- Team Accounts Only

| Start | Step 1 | Step 2 | Step 3 | Step 4 | | Step 5 | Step 6 | Step 7 | Step 8 | | Finish |

| Allow changes to project layout | Checkbox |

| Allow changes to project style settings | Checkbox |

| Allow changes to navigation settings | Checkbox |

| Allow changes to the headline text | Checkbox |

| Allow changes to the headline media | Checkbox |

| Allow changes to the page text | Checkbox |

| Allow changes to the page media | Checkbox |

| Allow changes to the page playback settings | Checkbox |

FIG. 14

Step 7: Video

| Start | Step 1 | Step 2 | Step 3 | Step 4 |   | Step 5 | Step 6 | Step 7 | Step 8 |   | Finish |

My Videos     Add Your Own

Apply Your Video To Your Presentations

| Section 1 | Section 2 | Section 3 |
| Section 4 | Section 5 | Section 6 |

Preview Your Video

Play/Pause/Forward/Back Controls/High/Low Quality Controls

Step 8: Audio Voice Over
My Voice-Overs    Add Your Own
Apply Your Voice Over To Your Presentation
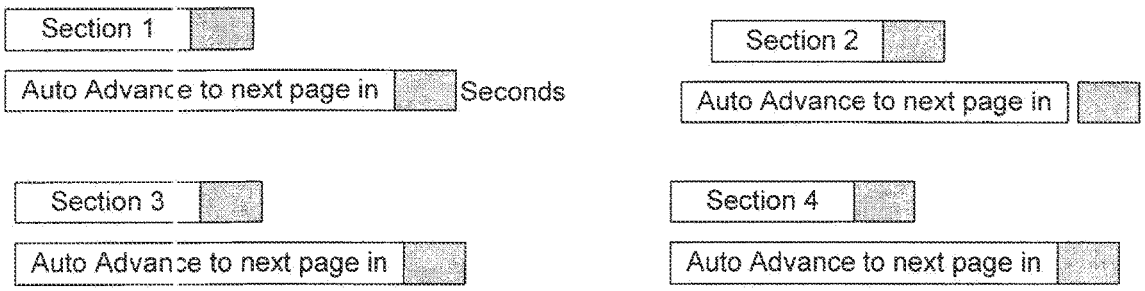
Preview Your Voice Over Cips
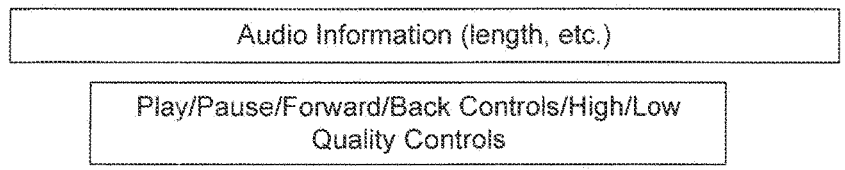
FIG. 16

MULTIMEDIA COMMUNICATION SYSTEM AND METHOD

CROSS-REFERENCES TO RELATED APPLICATIONS

This application is a continuation of U.S. patent application Ser. No. 16/792,087, filed Feb. 14, 2020, entitled "MULTIMEDIA COMMUNICATION SYSTEM AND METHOD", which is a continuation of U.S. patent application Ser. No. 15/937,568, filed Mar. 27, 2018, entitled "MULTIMEDIA COMMUNICATION SYSTEM AND METHOD", which is a continuation of U.S. patent application Ser. No. 15/795,136, filed Oct. 26, 2017, entitled "MULTIMEDIA COMMUNICATION SYSTEM AND METHOD", which is a continuation of U.S. patent application Ser. No. 15/174,945, filed Jun. 6, 2016, entitled "MULTIMEDIA COMMUNICATION SYSTEM AND METHOD", which is a continuation of U.S. patent application Ser. No. 14/590,881, filed Jan. 6, 2015, entitled, "MULTIMEDIA COMMUNICATION SYSTEM AND METHOD", which is a continuation of U.S. patent application Ser. No. 13/741,332, filed Jan. 14, 2013, entitled, "MULTIMEDIA COMMUNICATION SYSTEM AND METHOD", which is a continuation of U.S. patent application Ser. No. 13/004,862, filed on Jan. 11, 2011, entitled, "MULTIMEDIA COMMUNICATION SYSTEM AND METHOD" which is a continuation of U.S. patent application Ser. No. 11/404,509, filed Apr. 13, 2006, entitled "MULTIMEDIA COMMUNICATION SYSTEM AND METHOD", which claims priority under 35 U.S.C. § 119 to U.S. Provisional Application Ser. No. 60/671,170, filed Apr. 13, 2005, entitled "MULTIMEDIA COMMUNICATION SYSTEM AND METHOD", and the disclosures of which are incorporated herein by reference.

BACKGROUND

In today's internet age, development of a communication piece such as a presentation, banner advertisement, website or brochure, whether static or dynamically employing multimedia, is usually contracted out to a professional graphic designer. Such professional is typically part of a professional agency, such as an advertisement agency, which are usually cost-prohibitive for small enterprises (i.e. sole proprietor or small business), and can be unnecessarily costly for larger enterprises. These agents or agencies consume large amounts of resources, in time and/or money particularly, for creating a media-rich communication, such as a website, an e-mail campaign, a banner advertisement, or other communication. Accordingly, a system and method which automates the process of creating and distributing professional quality, media-rich communications is needed.

SUMMARY

This document discloses systems and methods for creating, editing, sharing and distributing high-quality, media-rich web-based communications, also known as "engines" or "creative works." The communications can be created in a layered fashion that integrates text, colors, background patterns, images, sound, music, and/or video. Other media can also be used. The systems and methods can be used to generate, edit, broadcast, and track electronic presentations, brochures, advertisements (such as banner advertisements on highly trafficked media websites), announcements, and interactive web pages.

In one aspect, a method and apparatus are provided for dividing the work of creating a multimedia file for a communication into a logical step-by-step, start-to-finish process that requires no programming intervention. In a specific exemplary embodiment, the multimedia file is based on Flash, an authoring software developed by Macromedia for vector graphics-based animation programs with full-screen navigation interfaces, graphic illustrations, and simple interactivity in an antialiased, resizable file format that is small enough to stream across any type of Internet connection and play while downloading. Other multimedia software and/or protocols can be used.

In particular embodiments, a system and method are provided for creating and/or delivering multimedia files via a SaaS model, and for loading media assets into an advertising engine online. In other embodiments, a system and method are provided for automatically creating and hosting data-specific communications for use as websites, presentations, advertisements, brochures and the like, for use with various communication media, systems and networks. The data-specific communications include, without limitation, data related to software programs, web services, proprietary data from third party databases, persons, locations, keywords, companies and combinations thereof.

In another aspect, a method and system are provided for automatically extracting and formatting multimedia code, such as Flash or other actionscript code, for use as a template that can be edited via a user interface without the intervention of a programmer, and for providing editorial control of multimedia files, keyword and content specific files or websites by a master user controlling the editorial rights of one to N number of sub-users within the system.

In yet other aspects, a method and apparatus are provided for online creation and editing of multimedia files compiled from a set of data; for creation, editing and distribution of multimedia files created from a wide variety of content including video, audio, images, text, raw data, Flash™ programs, software programs, web services or other media-rich content; and for auto-determining the "content" to be included in a communication based on answers to a series of prompts or interview questions and/or other meta data.

In yet other aspects, a method and apparatus is provided for auto-determining the "look and feel" of a communication based on a series of interview questions and/or other meta data, and for combining data, content, and "look and feel" to create unique communications. Other systems and methods are provided for converting unique communications to multiple formats and media, such as a website, a multimedia file, a printed medium, a video, etc.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 6-16 are block diagrams depicting a general system and method for creating, distributing and tracking multimedia and hypermedia-based communications.

Like reference symbols in the various drawings indicate like elements.

DETAILED DESCRIPTION

The systems and methods described herein relate to software as a service (SaaS), a software distribution model in which applications are hosted by a service provider and made available to users over a network such as the Internet. The systems and methods include the use of templates and a thin client interface to create multimedia communications. Low-level functionality of the multimedia communication system is accessed through a set of function calls and easily understood pre-built components for populating the template. Furthermore, an API provides a user access to the full scope of a programming language which allows for template scalability without the need for in-depth knowledge of the programming or authoring language to produce highly functional, professional template-based communications. Additionally, the systems provide sample source files to encourage reverse engineering.

Figure 1:
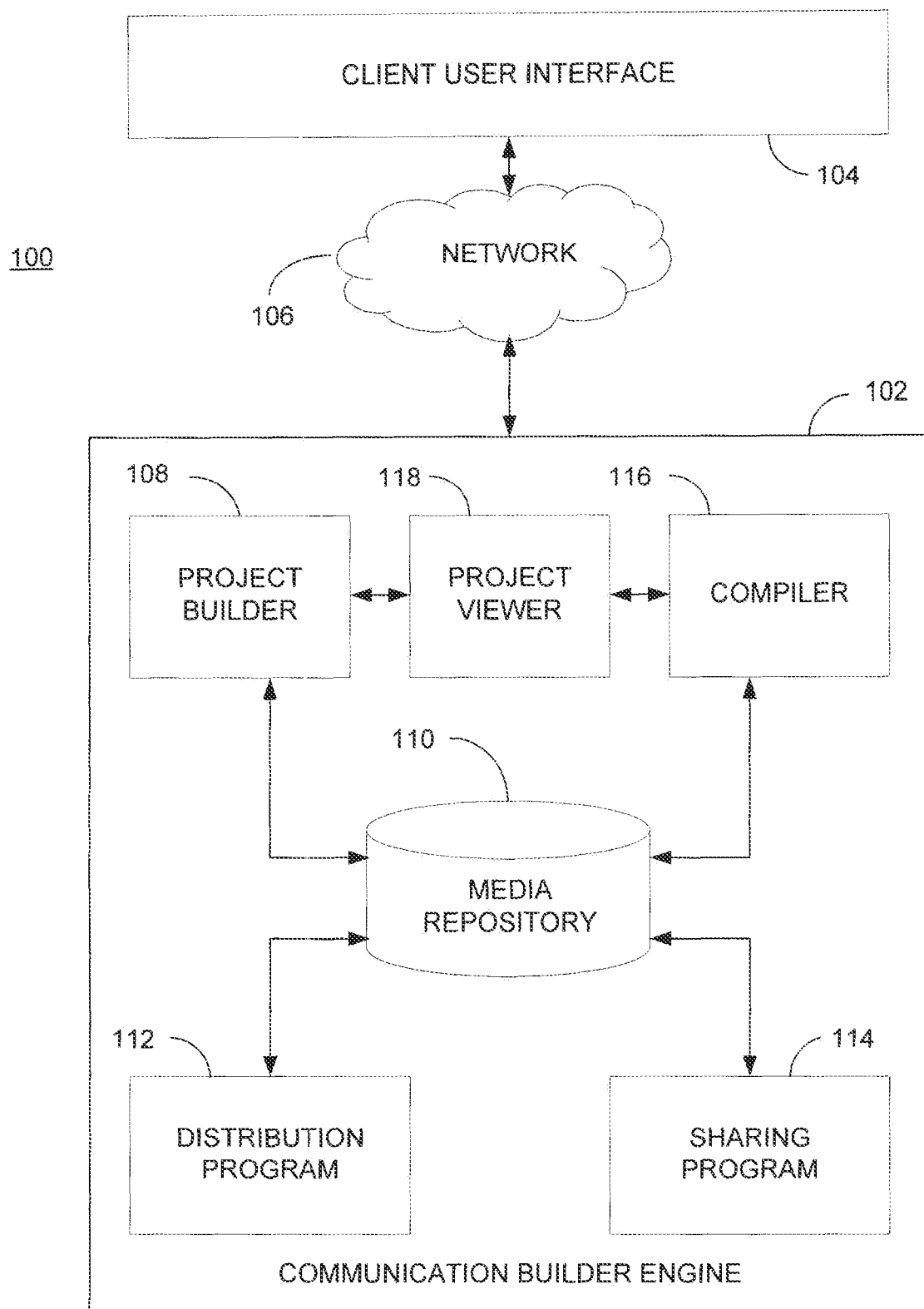
FIG. 1 illustrates a multimedia communication system.

FIG. 1 illustrates a multimedia communication system 100 for creating, storing and distributing multimedia communications (hereafter, "communications") such as, for example, content-rich e-mails, presentations, websites and segments of websites. The communication system 100 includes a communication builder engine 102 that interacts with a client user interface 104 over a network 106. The client user interface 104 can be a window in a browser application that runs on a personal computer. The network 106 is preferably the Internet, but can be any type of network, particularly as used in a client/server configuration.

The communication builder engine 102 includes a project builder 108 for generating a project viewer 118 via which a user can view and assemble various media components or assets into an integrated communication. The communication builder engine 102 further includes a media repository 110 for storing communication project templates, media assets, communication project metadata, and any other data resources used for creating, storing and distributing completed communication projects. The completed communication projects are accessed from the media repository 110 and distributed to selected recipients by a distribution program 112. The distribution program 112 controls the format and communication protocols for distributing the communications.

The communication builder engine 102 further includes a sharing program 114, which prompts a user to provide distribution parameters such as a type of communication (e-mail, website, etc.), a number and type of recipients, and communication medium by which the communication needs to be sent. The sharing program 114 can also report to the sending user certain qualitative and quantitative data such as transmission results, responses received from recipients, etc.

A communication is a collection of slides. The number of slides for any given communication project can range from 0 to N. The slide types that are available to any given communication project are dependent on the class of the communication, and are defined in the class XML file, and define a template class. The template class is chosen based on a number of user inputs. For example, one template class is chosen based on the responses to an interview/query process operated by the user of the system prior to creating the communication. This allows the system to only offer slide types that are relevant to the user's responses to the interview and/or query process.

Slides are a grouping of design layers, design elements, and content containers. The design layers are predefined and remain static. However, they are able to accommodate any design arrangement of content deemed necessary by the template designer. In an exemplary embodiment, the slide layers include background, main, foreground, and navigation. There is one core design file for each layer except for the main layer and they are as follows: background.fla, slideTypen.fla, foreground.fla, and nay.fla. The number of slideTypen.fla core files that exist depend on the number of slide types that are defined for the given class. For example, one particular class has five slide types defined in its XML class file. Therefore there are five main core design files (slideTypeO.fla, slideType1.fla, slideType2.fla, slideType3.fla, and slideType4.fla).

A class is a unique collection of slide type(s). The number of slide types in any given class can range from 1 to N. Classes are used to organize communication types by the quantity and type of content displayed on each slide in the class. For example, a template class can have five unique slide types, with each slide type containing no more than a certain number of content containers. In an embodiment, the slide type contains no more than five content containers, although more than five content containers can be used. However, instead of adding the new slide type to a template class, for example, a new class can be created to accommodate the new slide type(s). A class is defined, and a sufficient number of slide types are provided for the user to achieve their design goals, but the total number of slide types are limited as so not to overload the user with too many choices. The system manages and controls the creation and maintenance of all classes.

A slide type is a unique collection of media container(s). The number of containers for any given slide type can range from 1 to N. Slide types are used to organize the quantity and type of content that will be displayed on any given slide. In an exemplary embodiment, a number of standard container types can be used when creating a slide type. A text container includes text components and is used for displaying HTML, formatted text, a image container includes image components and is used to display images and .swf files, and a video container includes video components and is used to display streaming video. An audio container includes audio components and is used to provide streaming audio or audio clips. The user is responsible for the layout of the containers that appear on a slide. The quantities and types of containers for a given slide type are defined in the class XML file. Other than following the naming convention defined in the XML class file for the containers, the system is flexible and allows the user to use the containers in any design arrangement they choose. Each content type component, or media asset, can be represented in a palette of related content types, for selection by a user and incorporation into a communication.

The project viewer, such as the project viewer 118 shown in FIG. 1, is an application that renders or "serializes" the communication project slides and content, and provides them with functionality. When the project viewer is launched, it is passed a data structure and associated software programs called the project object. The project object contains the information necessary for the communication project to render and playback as configured by the end user. Slides are represented in the project object as elements in an array. Once the project object is loaded and interpreted, the project viewer determines a load sequence for the communication project content. The project object is agnostic as to the type of file it is rendering and is, therefore, able to produce a wide variety of communications such as websites, dynamically created websites, Flash™ banner ads, presentations, brochures, advertisements on third party websites, and/or the like.

The content loads in the specific design layer (i.e. background, foreground, etc.) assigned by the end user. As each layer loads in the load sequence, the project viewer then loads the content into the containers in that layer. Once the sequence has finished executing, the communication project will begin playback. Communication project playback has two states: auto-play on and auto-play off.

In one embodiment, if auto-play is on, the project viewer determines the duration property of the current slide. If the value of that property is greater than zero, the project viewer waits for that value in seconds before automatically advancing to the next available slide in the communication project. If the value of that property equals zero, the slide viewer stops on the slide until the user navigates to a different slide. If auto-play is off, users must use the slide navigation controls to view a different slide.

The project viewer also provides the conduit for the exchange of information and/or commands between the different design layers, or between the project viewer itself and a specific layer, referred to herein as the Slide Layer Interface. This interface not only enables the basic "built-in" functionality between the layers, their containers, and the project viewer, but also allows for much greater programming control for advanced developers. This is because the Slide Layer Interface is basically a collection of pointers. In an embodiment, this interface allows the direct use of AS 1.0 as the command language. This will enable the creation of highly functional and complex core files able to achieve all customization needs that fit within the programming scope of AS 1.0, the specification for which is incorporated by reference herein.

Any content that loads on the main layer will change from slide type to slide type. Any content that loads on the background, foreground, or navigation layers typically remains constant and does not change between slides. That content is referred to as "universal content," and typically consists of header logos, communication titles, headlines, etc. Mechanisms allow slide layers to communicate with each other as well as load any type of content on any layer. All of the complex programming needed to govern content loading, playback, and functionality has been incorporated into the project viewer and container components.

The system includes a number of core design files. One such file is "background.fla." This file is loaded in the bottom-most position in the project viewer. Any content or design elements that needs to appear behind other content or design elements should be placed in this core file. The background.fla file has a number of native functions:

initTemplateObject( ): This function is called after the first frame is fully loaded. This function creates the templateObject object which is used by the project viewer.
  setValues( ): This function is called after ieController has been assembled and distributed to the various layers. Color information is retrieved from the ieController object and stored in local variables (color1 Value, color2Value, color3Value). These values can be used to dynamically color shape elements (i.e. movie-clips) used in the template. This function is also used to distribute any image, .swf, video, or HTML, text content to their proper movie clips for the currently selected slide.
  startPlayback( ): This function is called by the project viewer after this .swf has been fully loaded and initialized.

Another core design file is "foreground.fla". This file is loaded just under the top-most position (nay.fla) in the project viewer. Any content or design elements that need to appear above other content or design elements (except the navigation controls) are placed in this core file. Native functions of "foreground.fla" include:

initTemplateObject( ): This function is called after the first frame is fully loaded. This function creates the templateObject object which is used by the project viewer.
  setValues( ): This function is called after ieController has been assembled and distributed to the various layers. Color information is retrieved from the ieController object and stored in local variables (color1Value, color2Value, color3Value). These values can be used to dynamically color shape elements (i.e. movie-clips) used in the template. This function is also used to distribute any image, .swf, video, or HTML text content to their proper movie clips for the currently selected slide.
  startPlayback( ): This function is called by the project viewer after this .swf has been fully loaded and initialized.

Another core design file is "intro.fla". This file loads prior to any other core file. No other core files will render until this file is done executing. It is located on layer above the nay.fla file. Native functions of this file include:

initTemplateObject( ): This function is called after the first frame is fully loaded. This function creates the templateObject object which is used by the project viewer.
  setValues( ): This function is called after ieController has been assembled and distributed to the various layers. Color information is retrieved from the ieController object and stored in local variables (color1Value, color2Value, color3Value). These values can be used to dynamically color shape elements (i.e. movie-clips) used in the template. This function is also used to distribute any image, .swf, video, or HTML text content to their proper movie clips for the currently selected slide.

A "slideTypen.fla" core design file loads above the background file and below the foreground file. Main slide content typically appears in this file. Its functions include:

initTemplateObject( ): This function is called after the first frame is fully loaded. This function creates the templateObject object which is used by the project viewer.
  setValues( ): This function is called after ieController has been assembled and distributed to the various layers. Color information is retrieved from the ieController object and stored in local variables (color1Value, color2Value, color3Value). These values can be used to dynamically color shape elements (i.e. movie-clips) used in the template. This function is also used to distribute any image, .swf, video, or HTML text content to their proper movie clips for the currently selected slide.
  startPlayback( ): This function is called by the project viewer after this .swf has been fully loaded and initialized.

A "nay.fla" core design file loads above the foreground file and includes the navigation controls. The visibility of the navigation controls is determined by the end user. Toggling the visibility to false causes the project viewer to skip the loading of this file. Its native functions include:

initTemplateObject( ): This function is called after the first frame is fully loaded. This function creates the templateObject object which is used by the project viewer.

setValues( ): This function is called after ieController has been assembled and distributed to the various layers. Color information is retrieved from the ieController object and stored in local variables (color1Value, color2Value, color3Value). These values can be used to dynamically color shape elements (i.e. movie-clips) used in the template. This function is also used to distribute any image, .swf, video, or HTML text content to their proper movie clips for the currently selected slide.

buildNavigation( ): This function is called by the navPane clip after it is fully loaded on the time line and after the ieNavXML XML object is created and placed on this time line. The ieNavXML XML object is created inside the project viewer based on the tree structure of the slides (i.e. how they are organized in the tree hierarchy). Main options are represented by Parent nodes in the XML object. Menu items are Children of the particular Parent node.

changeSlide(optionNumber, itemNumber): This function is called when an item is clicked in the navigation menu controls. Options are grouped by main options and sub options. The first main option is indexed at zero and all first sub-options are also zero-indexed. When a menu item is clicked, it simply passes the main option it is located at as the optionNumber parameter. The value of the itemNumber parameter is same as the menu item's position in the list of sub-options. For example: The third sub-option "About Our Company" of the second main option "About Us" would make the call to changeSlide( )-changeSlide(1, 2).

A configuration file "containerData.xml" defines the class. It is provided only as a reference as to how containers are declared within a slide type, and how slide types are declared within the class. This file is used by the project viewer application and the project builder application for determining available slide types and locating the containers within the slide.

Container Components

Working examples of container components are provided in a "Source.fla" folder to illustrate how the container components are integrated into the template design. In these examples is shown a fully functional template so that a deep understanding of how the components work is not necessary. Once the user is comfortable with the core design files and how the components operate, the system provides different ways to apply design style changes to the components.

Image Component

The image component is a multimedia module that is used inside the core design files to load and display images and/or .swf files. One such multimedia module is based on a Macromedia Flash MX® component, which in turn is based on AS 1.0. The user integrates and positions this component into their design. Once finished, the component will be able to load and display any image or .swf content that the end user assigns to it. The image component is easy to integrate into any graphic layout or animation schema, and does not restrict the user from using Flash™ animation or other visual effects. The image component is used only in edit mode.

From the main timeline inside a core template file (for example: a five slide class, foreground.swf), this component can be found at the frame labeled "staticView", inside of a movie clip named foreground GaphicA. The module init-Layout( ) is used to initialize the component and prepare it to begin loading image or .swf content. Properties include:
    containerWidth: sets the width of the display pane.
    containerHeight: sets the height of the display pane.
    containerPath: is a component, such as a Flash™ component, as defined in the XML class file.
    slideLayer: defines the layer in which this component is located. Valid values can include "foreground", "background", and/or "communication".

Video Component

The video component is used inside the core design files to load and display .flv video. In an embodiment, the video component is a Macromedia Flash MX® component based on AS 1.0. The template designer integrates and positions this component into their design. Once finished, the component will be able to load and display any .flv content that the end user assigns to it. The video component is also easy to integrate into any graphic layout or animation schema, and does not restrict the user from using Flash™ animation or other visual effects. The video component is used only in playback mode.

In order to use the video component, from the main timeline inside a core template file (for example: five slide class, foreground.swf), the video component can be found inside of a movie clip named imageContainer1.videoContent. The video component includes the following methods: initLayout( )—used to initialize the component and prepare it to begin playing a video stream; and initVideoPane(videoURL, bufferTime, videoVolume)—used to start the video stream. The properties of the video component include:
    containerWidth: sets the width of the video pane.
    containerHeight: sets the height of the video pane.
    controllerXPos: sets the x-position of the playback controller. A value of −1 aligns the left edge of the controller with the left edge of the video pane.
    controllerYPos: sets the y-position of the playback controller, where a value of −1 aligns the top edge of the controller with the bottom edge of the video pane.
    controllerWidth: sets the width of the playback controller, where value of −1 causes the controller to adopt the width of the video pane.
    callback: a function that gets called when the video buffer is full.
    autoSizePane: that forces sizing, alignment, and position of the video pane and the playback controller.
    controlBarHeight: sets the height of the playback controller.

Text Component

The text component is used inside the core design files to load and display HTML formatted text. In an embodiment, the text component is a Macromedia Flash MX® component based on AS 1.0. The user integrates and positions this component into their design, and then names the component according to the class XML file. Once finished, the component will be able to load and display any HTML text content that the end user assigns to it. The text component is needed only in edit mode. During playback, specific text content is manually assigned to a Flash™ text field by the user.

The text component can be found, from the main timeline inside a core template file (for example: five slide classes, foreground.swf), at the frame labeled "staticView", inside of the movie clips named foregroundTextA and foregroundTextB.

The function call "initLayout( )" is used to initialize the component and prepare it to begin displaying HTML text. Properties of the text component include:

containerWidth: sets the width of the text pane.

containerHeight: Sets the height of the text pane.

containerPath: The Flash path of the component as defined in the XML class file.

headline: a Boolean property that sets the display state of the component. Text components set to the headline state are able to use a custom movie clip to display the text content. This allows the user to use custom fonts and text styles and disable text formatting from the user.

staticHeadline: The name of the linked clip in the library to use to display the text content.

slideLayer: The layer in which this component is located. Valid values are "foreground", "background", and "communication".

Custom Components

Custom components are designed and implemented by the user or template designer, and can be used just like the standard components for integration into the communication project. Custom components pass a configuration object to the slide viewer which allows the user to configure any properties of the component. This object is a basic name/value structure that represents a hash of the property/value pairs. This hash is then be dynamically integrated into the system and assigned to the slide on which it is located. This schema allows user/developers to create and introduce powerful components that can handle tasks such as xml feeds (such as data from the Google Adwords or Overture system, or other proprietary data feeds from proprietary databases, conferencing/chatting, or web services), along with many other applications.

Custom components can include voiceover narration (i.e. digital voice files), personal audio files, special images and/or graphics such as logos, and videos that a user provides to the system for storing in the media repository, View Modes The user builds their layout in the core design files. The project viewer is able to open and render these files in a layered manner so that the content "stacks" according to the layer on which it is located. For example, content on the background layer appears below content in the foreground layer. In one embodiment, there are two project viewers. In a preferred exemplary embodiment, the two project viewers are substantially identical. One of the project viewers is provided for live playback of the communication project, while the other is embedded within the communication project builder and is needed to render the core files to the end user so that the user can edit desired content in the containers. In an alternative embodiment, another project viewer is provided to render out or "serialize" completed communication files into a variety of third party formats such as .swf, .pdf, xml, html, txt, or any other format.

Accordingly, all of the core files can support two states: a playback state and an edit state. These states are designated within each core file by a frame label. When loaded into the builder, the project viewer immediately sends the playhead inside the core files to the frame labeled "staticView". Otherwise, the playhead is positioned at the first frame and stopped until the communication project is ready to play.

Live View

"Live View" describes the full playback of a communication project. During live view, all functionality, design, and animation are active and visible to the end user. It is the finished product as configured by the user.

Edit View

"Edit View" is experienced within the project builder and, in some instances, the "Live View" where a user contributes edits or comments to a communication. Though functionality and design remain intact, animations are disabled. This "display" view offers the users context within the design so content can be configured and assigned to containers.

Groups

"Groups" is an application that enables groups of users to create, edit, share and distribute communications created by the system according to a set of business rules. For example, a group of 25 users can utilize the system to communicate a uniform message, yet still retain the autonomous controls to customize each communications piece according to the rules set up by the Administrator. Each Group contains a defined set of roles and abilities. These abilities are set by a system administrator, and then utilized by the users in that Group.

In one embodiment, a user can purchase access to a group of other users, called a "Team account." In the Team account, one administrator has the right to share communications with the other users; in effect, creating communications for them and giving them limited rights to edit the communication. In another embodiment, a user can purchase access to an enterprise group of users which can be N number of users and M number of administrators. This functionality gives the enterprise the ability to uniformly use the same communication, but tailor it to a specific market, segment, opportunity or the like.

Sharing

"Sharing" is an application that enables administrators and users to set up a system, whereby administrative users can create and share communications with N number of users in up to N accounts or physical locations. Several types of sharing exist, each having a set of advantages. In one example, three types of sharing include: Live Sharing, Linked Sharing, and Smart Sharing. Live Sharing maintains a link between the communications in use so that an administrator can make changes to a communication, so that changes to the communication are updated in real time. That is, there is no time delay between the time the edit is made and the time the edit is published live to the communication.

Linked Sharing allows an administrator to make changes to a "main" communication and up to N "derivative" communications such that changes to the main communication are disseminated to each derivative communication in real time. Accordingly, there is no time delay between when an edit is made and the time the edit is published live to each relevant communication.

Smart Sharing allows several Administrators to make changes to several "main" communication and up to N "derivative" communications, such that changes to the main communication are disseminated to each derivative communication in real time. Thus, there is no time delay between the time an edit is made and the time the edit is published live to each derivative communication. However, in Smart Sharing, business rules are applied so that an organizational hierarchy can be created to manage the flow of the main and derivative communications. Business rules of Smart Sharing are also applied to allow for deletion of derivative communications from the system without affecting other derivative communications in the linked chain. This allows for the consistent and rapid dissemination of information across a broad range of users, and is particularly useful for a corporate salesforce or regional advertisers in maintaining a consistent communications message.

Example

The following describes an example of the functionality of the system and method described herein, as used by a user.

A membership account includes online access to all the functions for editing, distributing, and tracking your communications. A variety of selectable options are offered based on a user's individual needs. The number of communications in an account is based on the membership level purchased. A user may edit communications as often as desired, and as many copies as desired can be saved to a storage device, such as a computer hard drive. To access the account (and associated communications), a user must first login from a homepage, i.e. www.impactengine.com. The user then must specify a user name and password that was used to sign up. To change account information, a user can select a "My Account" link from a main navigation bar, shown in the screen shots as being located on the left side of a page, and then select a "Make Changes" control to make a change.

Edit Process

There is no limit to how often a communication can be updated. Accordingly, recipients and viewers can always see the most up-to-date information. To edit a communication, a user first enters "Edit Mode" by selecting the "Edit" button next to the name of the selected communication. The "Edit" button is located in a communication Control Panel on the "MyHome" page, preferably at the top of the page.

Once in Edit Mode, a user will see a new navigation menu above, and can click on the appropriate tab and make any changes in the forms provided. When finished, the user selects the "finish" button and the communication will be updated. The communication is pre-filled with default text, however all fields can be updated with whatever information chosen. Graphics may be uploaded in "Edit Mode" by selecting the "Upload" button to access and upload images. The steps to be followed can be displayed to upload images from your hard drive. Each membership includes an amount of disk space memory, i.e. up to a gigabyte of disk space, in which images are stored.

Distribute

Once a communication is created, a user may use it in a variety of ways including: as a website, as a printed communication, as an email, or as a communication stored on a hard disk, CD-rom or other media device. All features are available from the main navigation inside a user account. An email function can be accessed by selecting the "Show" button next to the name of the communication to be sent. The "Show" button is located in the communication Control Panel on the home page. The user is provided a form to complete, and the communication will be sent to the designated e-mail recipients. Each recipient is sent a standard email with a graphic "view" link at the bottom. This link launches the communication directly from a designated website. There are no attachments or downloads needed. The body, title, and "from" name of the message can be customized.

The email interface allows a user to send a communication to one or more recipients at a time. In an embodiment, the number of recipients is limited to a particular number, i.e. six recipients. A user may send as many emails as desired. Spamming of any kind is forbidden in conjunction with an account.

CD-ROM cards that include the communication can also be created. CD-ROM cards play in standard tray loading CD-ROM drives on Windows and Macintosh computers. The communication will automatically launch for maximum impact.

A communication can also be used as a user's home page. To execute this functionality, a user can click on the "My Websites" from inside the account to generate a website based on the communications that are chosen. Then, the Domain Name Service (DNS) settings are automatically set up with the system's servers, and the website is available by typing in any URL (i.e. www.mywebsite.com). This function is used as the core to use any communication created by the communication builder engine system as a dynamically created site for use with private web sites such as Google, Overture, eBay, Amazon and the like.

A communication can also be added to an existing web page by clicking on the "Show" from inside the account to generate HTML or the actionscript ("objectembed") code to directly embed the file into the page. This HTML can be placed anywhere on a web page.

Figure 2:
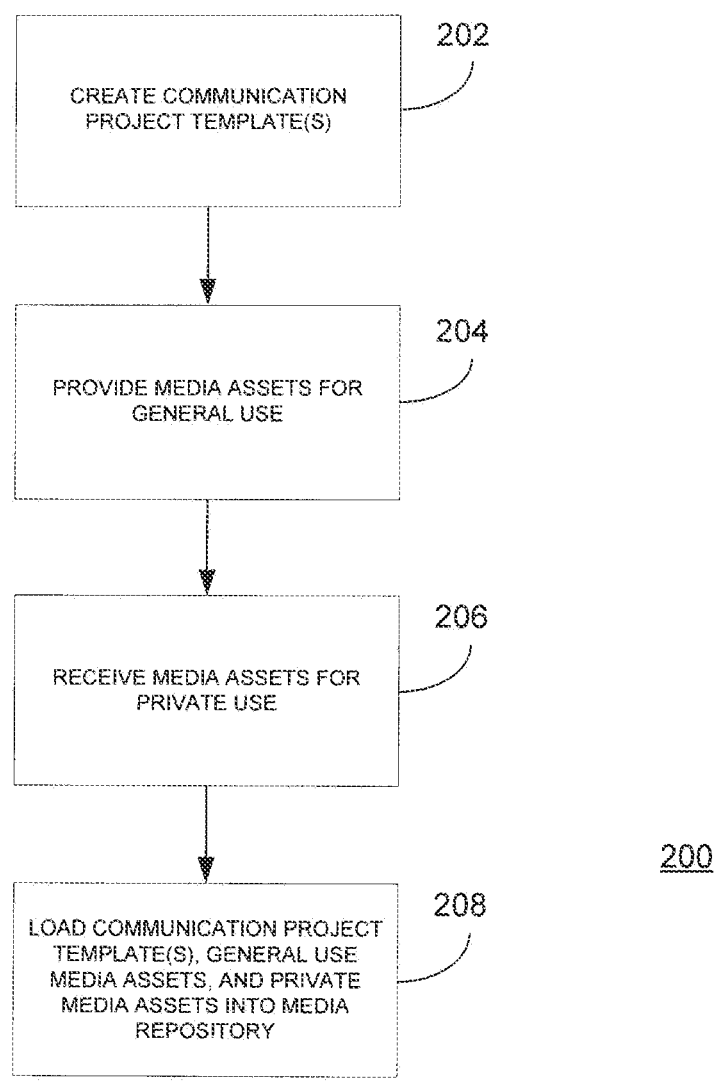
FIG. 2 illustrates a method for creating a template includes creating one or more communication templates.

In accordance with the above description, and as shown in FIGS. 2-5, a communication method includes a number of steps for creating, storing and distributing multimedia communications. As shown in FIG. 2, a method 200 for creating a template includes creating one or more communication templates, at 202. The templates are typically created by designers and represent general structures and arrangements of multimedia communications that are suitable for distribution to a number of different recipients via a number of different transmission mechanisms. In a preferred embodiment, the templates are created in Flash™ actionscript using a proprietary application programming interface (API) for being loaded into the media repository.

At 204, media assets are provided for general use by any user. The media assets include media components such as text, font type, audio clips, video clips, images or graphics, Flash™ animation files, etc. At 206, media assets for private use are received by the communication builder engine and system. These private media assets can include proprietary logos, images, sound files, or the like. At 208, the project template(s), general use media assets, and private use media assets are loaded and stored into the media repository, for future access by the user. Private media assets can be accessed only by the user (or authorized agent thereof) that provided them.

Figure 3:
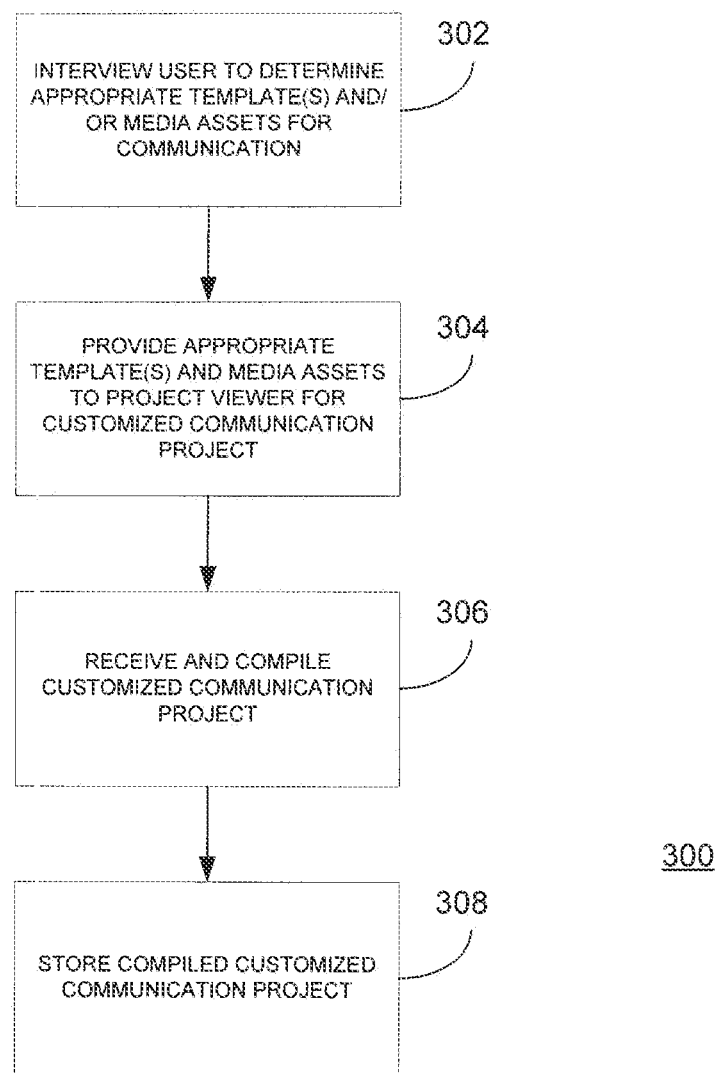
FIG. 3 illustrates a method 300 for template customization and media asset usage.

FIG. 3 illustrates a method 300 for template customization and media asset usage. At 302, the communication builder engine interviews the user to determine the templates and/or media assets that will be appropriate for that user. For instance, a real estate agent user may indicate a need to utilize stock images of houses, as opposed to images of only people in social settings. Likewise, the type, profession, or characteristics of the user can be used to tailor the types of templates and/or media assets that will be available for access by that user, so as to not overburden the user with choices, but also to intelligently provide the user with the most pertinent and efficient communication creation system possible.

At 304, the communication builder engine provides the appropriate templates and/or media assets to the user, as determined by the interview or by user input data, for being customized into a communication by the user. At 306, the customized communication project(s) are received from the user and compiled into a format suitable for transmission. At 308, the compiled communications are stored as projects in the media repository, for access by the distribution and sharing programs.

Figure 4:
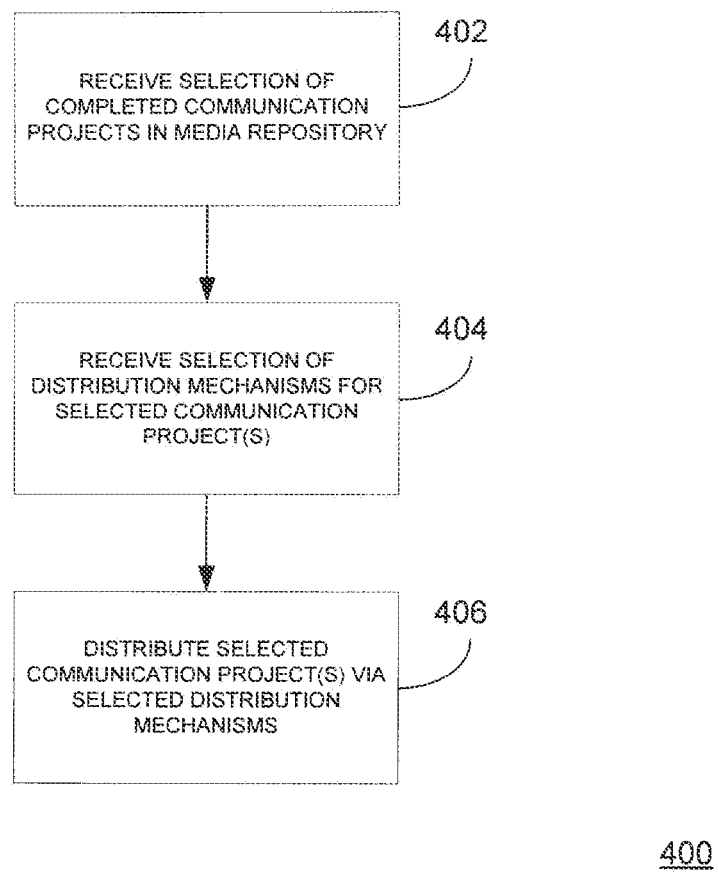
FIG. 4 illustrates a method 400 for distributing and tracking communications.

FIG. 4 illustrates a method 400 for distributing and tracking communications. At 402, the communication builder engine receives a selection of completed communication projects that have been stored in the media repository. At 404, the communication builder engine receives from the user a selection of distribution mechanisms by which the communications will be transmitted. The distribution mechanism include, without limitation, websites, e-mail systems, CD-ROM, DVD, or via an offline copy (i.e. hardcopy or print). At 406, the selected communications are distributed to the selected distribution mechanisms for transmission or sending to the selected recipients.

Figure 5:
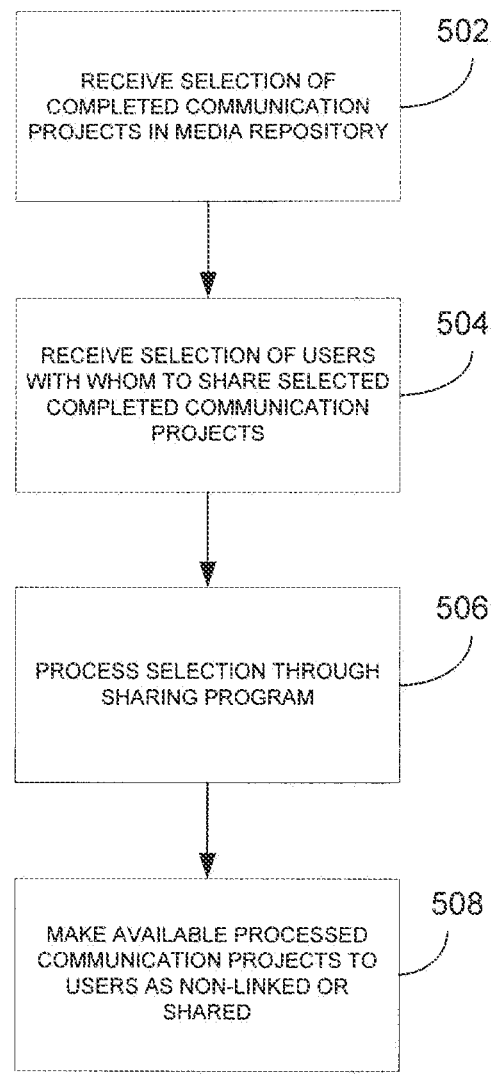
FIG. 5 illustrates sharing by users of media assets with other users.
Figure 9:
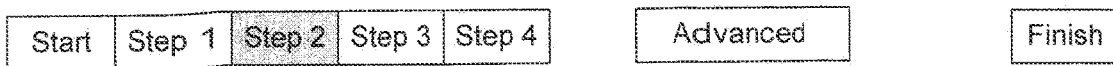
Figure 11:
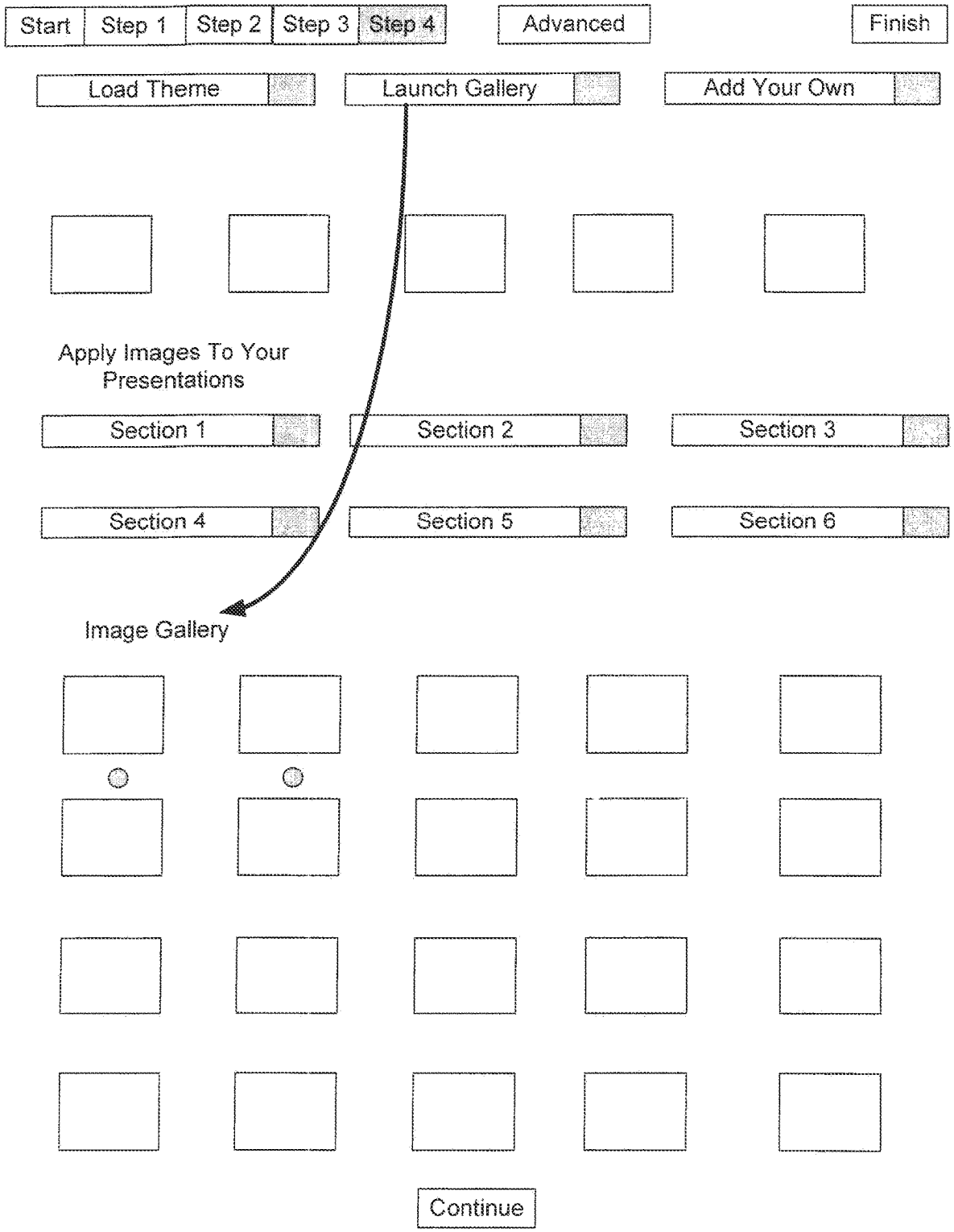

FIG. 5 illustrates sharing by users of media assets with other users that may be affiliated by employer, by contract or other arrangement. At 502, the communication builder engine receives a selection of completed communication projects that can be shared among one or more other users. At 504, the one or more other users are identified and received by the communication builder engine. At 506, the sharing program of the communication builder engine processes the selections, and at 508 the processed selections and associated communication projects and/or media assets are made available to the selected one or more other users.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A multimedia communication system comprising:
a server configured to provide an API, the API configured to enable upload of multimedia files and media assets, the API further configured to extract multimedia code from one or more of the multimedia files and format the extracted multimedia code for use as a media rich template comprising slides including a grouping of design layers, design elements, and content containers, the template further including template coding comprising XML for facilitating generation, editing and distribution of the template;
a media repository coupled to the server, the media repository configured to store the media rich templates and the media assets, the media rich templates and the media assets being accessible by a graphical user interface on a client computer via a network;
wherein the server is further configured to provide a project builder, the project builder providing the graphical user interface on the client computer, the graphical user interface including controls for allowing user selection of at least one media rich template and at least one media asset, the project builder being configured to receive the user selections and retrieve templates and media assets based on the user selections, the project builder further configured to enable the user to access and edit the media rich template with media assets to produce a multimedia communication including the slides, the grouping of design layers, design elements and content containers, and the template coding.

2. The multimedia communication system of claim 1, wherein the server is further configured to provide a project viewer, wherein the project viewer is configured to render the multimedia communication in the graphical user interface, and to receive and interpret a project object comprising data structures representing the multimedia communication, wherein the operative accessing of the project object by the project viewer enables the multimedia communication to be viewable by the user in the graphical user interface.

3. The multimedia communication system of claim 2, wherein the project object is agnostic to type of file it is rendering.

4. The multimedia communication of claim 2, wherein the project viewer comprises a slide layer interface including pointers for establishing a conduit for the exchange of information and/or commands between the project viewer and a specific design layer.

5. The multimedia communication system of claim 2, wherein the project object interprets the template coding for facilitating the generation, editing and distribution of the multimedia communication.

6. The multimedia communication system of claim 1, wherein the slides are organized in the media repository by slide type and class, the type based on the quantity and type of content on each slide, and the class defining a unique collection of slide types.

7. The multimedia communication system of claim 2, wherein one or more of the content containers receives a media asset based on an edit made by a user via the project builder, the container receiving the media asset via the operative coupling of the project viewer and the project object.

8. The multimedia communication system of claim 7, further wherein the server is further configured to provide a compiler to integrate the selected media asset into the container of the selected template to generate the communication, the compiling being based on the template coding associated with the template and media asset.

9. The multimedia communication system of claim 8, further wherein the server is further configured to provide a formatter for formatting the communication based on a plurality of electronic distribution formats, the plurality of electronic distribution formats comprising advertisements formatted for display on a web page and advertisements formatted for display on a mobile device.

10. The multimedia communication system of claim 9, wherein the electronic distribution format comprises an animation file for display on a plurality of devices.

11. The multimedia communication system of claim 10, wherein the server is further configured to provide a distribution program for distributing the communication based on the template code.

12. The multimedia communication system of claim 11, wherein at least one of the one or more of the template code pertains to a keyword.

13. The multimedia communication system of claim 1, wherein the API provides sample source files to the user.

14. The multimedia communication system of claim 13, wherein sample source files are provided to the user to encourage reverse engineering.

15. A multimedia communications system for generating and distributing a communication to a graphical user interface of a recipient device, the communication capable of being rendered, the online communication system comprising:
a server configured to provide an API, the API configured to enable upload of multimedia files and media assets, the API further configured to extract multimedia code from one or more of the multimedia files and format the extracted multimedia code for use as a media rich template comprising slides including a grouping of design layers, design elements, and content containers, the template further including template coding comprising XML for facilitating generation, editing and distribution of the template;
a media repository coupled to the server, the media repository configured to store the media rich templates and the media assets, the media rich templates and the media assets being accessible by a graphical user interface on a client computer via a network;

wherein the server is further configured to provide a project builder, the project builder providing the graphical user interface on the client computer, the graphical user interface including controls for allowing user selection of at least one media rich template and at least one media asset, the project builder being configured to receive the user selections and retrieve templates and media assets based on the user selections, the project builder further configured to enable the user to access and edit the media rich template with media assets to produce a multimedia communication including the slides, the grouping of design layers, design elements and content containers, and the template coding; and wherein the server is further configured to provide a project viewer comprising a slide layer interface including pointers for establishing a conduit for the exchange of information and/or commands between the project viewer and a specific design layer, the project viewer being configured to render the multimedia communication in the graphical user interface, and to receive and interpret a project object;

wherein the project object interprets the template coding for facilitating the generation, editing and distribution of the multimedia communication, wherein the operative accessing of the project object by the project viewer enables the multimedia communication to be viewable by the user in the graphical user interface, and wherein the slides are organized in the media repository by slide type and class, the type based on the quantity and type of content on each slide, and the class defining a unique collection of slide types.

16. The multimedia communication system of claim 15, wherein one or more of the content containers of the template receives a media asset based on an edit made by a user via the project builder, the container receiving the media asset via the operative coupling of the project viewer and the project object.

17. The multimedia communication system of claim 16, wherein the server further provides a compiler configured to integrate the selected media asset and template coding into the container of the selected template to generate the communication, the compiling being based on the template coding associated with the template and media asset.

18. The multimedia communication system of claim 17, further wherein the server further provides a formatter for formatting the communication based on a plurality of electronic distribution formats, the plurality of electronic distribution formats comprising advertisements formatted for display on a web page and advertisements formatted for display on a mobile device.

19. The multimedia communication system of claim 15, wherein the server is further configured to provide a distribution program for distributing the communication based on the template code.

20. The multimedia communication system of claim 15, wherein at least one of the one or more of the template codes pertains to a keyword.

21. The multimedia communication system of claim 15, wherein the API provides sample source files to the user.

22. The multimedia communication system of claim 21, wherein sample source files are provided to the user to encourage reverse engineering.

* * * * *